(12) United States Patent
Choi et al.

(10) Patent No.: US 8,984,212 B2
(45) Date of Patent: Mar. 17, 2015

(54) NON-VOLATILE MEMORY SYSTEM

(75) Inventors: Wan-soo Choi, Suwon-si (KR); Hee-tak Shin, Hwaseong-si (KR); Won-jin Lim, Seoul (KR); Bong-gwan Seol, Seoul (KR); Jun-seok Park, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 262 days.

(21) Appl. No.: 13/563,048

(22) Filed: Jul. 31, 2012

(65) Prior Publication Data

US 2013/0046919 A1 Feb. 21, 2013

(30) Foreign Application Priority Data

Aug. 18, 2011 (KR) .................. 10-2011-0082339

(51) Int. Cl.
*G06F 12/02* (2006.01)
(52) U.S. Cl.
CPC .... *G06F 12/0246* (2013.01); *G06F 2212/7201* (2013.01); *G06F 2212/7207* (2013.01)
USPC .......................................................... 711/103
(58) Field of Classification Search
CPC .................................................. G06F 12/0246
See application file for complete search history.

(56) References Cited

U.S. PATENT DOCUMENTS

| | | | |
|---|---|---|---|
| 7,315,976 B2 * | 1/2008 | Holt | 714/769 |
| 7,873,619 B1 * | 1/2011 | Faibish et al. | 707/705 |
| 2006/0200470 A1 | 9/2006 | Lacapra et al. | |
| 2010/0070735 A1 * | 3/2010 | Chen et al. | 711/206 |
| 2014/0059406 A1 * | 2/2014 | Hyun et al. | 714/773 |

FOREIGN PATENT DOCUMENTS

| | | | |
|---|---|---|---|
| JP | 2000099282 A | 4/2000 | |
| JP | 2009187213 A | 8/2009 | |
| KR | 20020039663 A | 5/2002 | |

* cited by examiner

*Primary Examiner* — Hiep Nguyen
(74) *Attorney, Agent, or Firm* — Harness, Dickey & Pierce, P.L.C.

(57) ABSTRACT

In one embodiment, a memory system includes a memory device with a first memory and a second memory, and a controller configured to control storing of data in the memory device. The controller is configured to control an $(N-1)^{th}$ piece of meta data to be stored in the second memory when an $N^{th}$ piece of user data is stored in the first memory or control the $N^{th}$ piece of the user data to be stored in the second memory when the $(N-1)^{th}$ piece of the meta data is stored in the first memory, where N denotes a natural number equal to or greater than '1'. Also, a time period of storing the $N^{th}$ piece of the user data is controlled to partially or entirely overlap with a time period of storing the $(N-1)^{th}$ piece of the meta data.

20 Claims, 14 Drawing Sheets

Meta Data

| Mapping Information | Write Count | Physical Page Information |
|---|---|---|
| LP1 to PP2 | PP1_24 | PP1_Valid |
| LP2 to PP2 | PP2_30 | PP2_Invalid |
| LP3 to PP2 | PP3_16 | PP3_Invalid |
| ⋮ | ⋮ | ⋮ |

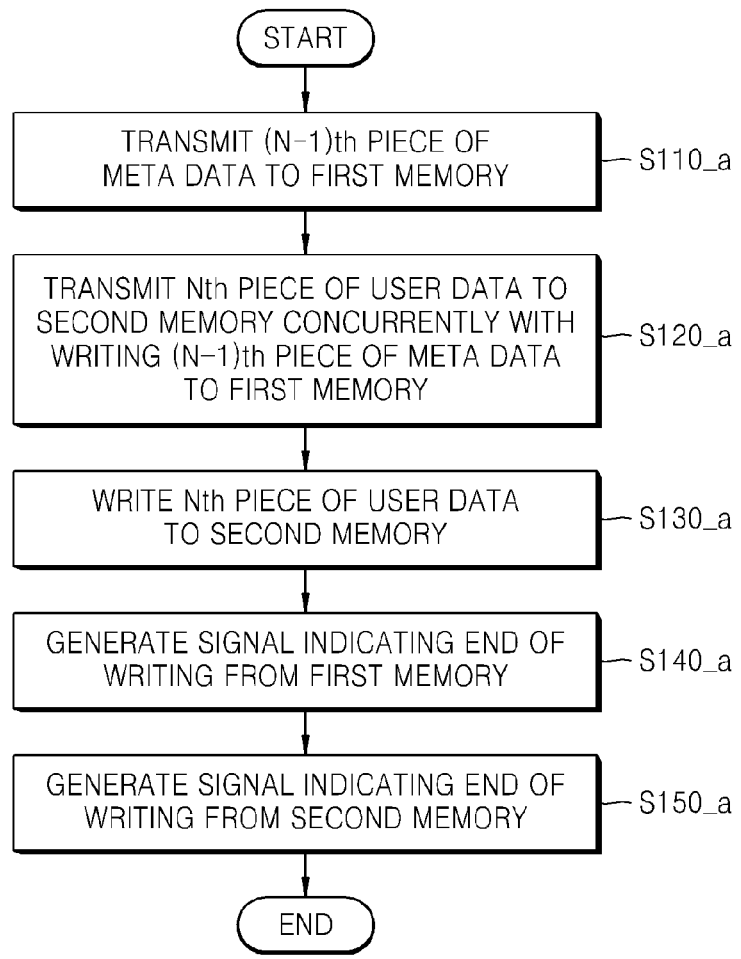
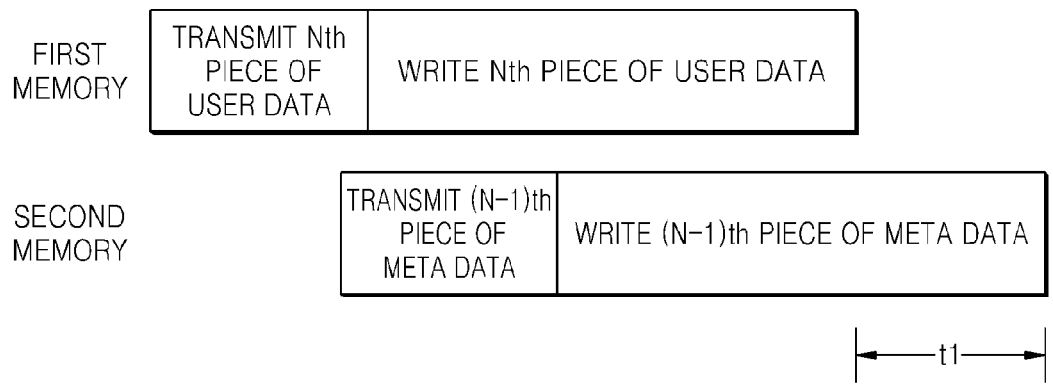

NON-VOLATILE MEMORY SYSTEM

CROSS-REFERENCE TO RELATED APPLICATIONS

This application claims the benefit of Korean Patent Application No. 10-2011-0082339, filed on Aug. 18, 2011, in the Korean Intellectual Property Office, the disclosure of which is incorporated herein in its entirety by reference.

BACKGROUND

The inventive concepts relate to non-volatile memory systems.

Flash memory is a type of non-volatile semiconductor device and is mainly used in mobile electronic products. In general, reading or writing is performed on a flash memory in units of pages, and erasing should first be performed thereon in units of blocks each consisting of a plurality of pages to perform rewriting to update data stored in the flash memory. Thus, overwriting cannot be performed on the flash memory. In a memory device on which overwriting cannot be performed, a logical address that is to be accessed by a host is mapped to an actual physical address of a memory. In this case, data that includes mapping information between the logical address and the physical address is referred to as 'meta data'. The meta data should be stored in the memory after writing of user data to the memory is completed. Thus, it takes a relatively long time to write not only data that a user desires to write but also meta data that is at least one page long. Accordingly, a response time to a request to perform a write operation, which is received from the host, may be delayed, thereby degrading the performance of the memory system.

SUMMARY

The inventive concepts provide a non-volatile memory system capable of controlling a time period of writing meta data to partially or entirely overlap with a time period of writing user data.

According to one embodiment, a memory system, including a memory device including a first memory and a second memory; and a controller configured to control storing of data in the memory device such that the controller controls an $(N-1)^{th}$ piece of meta data to be stored in the second memory when an Nth piece of user data is stored in the first memory or controls the $N^{th}$ piece of the user data to be stored in the second memory when the $(N-1)^{th}$ piece of the meta data is stored in the first memory, where N denotes a natural number equal to or greater than '1', and a time period of storing the $N^{th}$ piece of the user data partially or entirely overlaps with a time period of storing the $(N-1)^{th}$ piece of the meta data.

The controller may include a processor configured to control transmitting of data to the memory device; and a data buffer configured to temporarily store the $N^{th}$ piece of the user data and the $(N-1)^{th}$ piece of the meta data. The memory device may further include a data bus via which data is transmitted to the first memory and the second memory. The processor may be configured to control the $N^{th}$ piece of the user data to be transmitted from the data buffer to the first memory and then to control the $(N-1)^{th}$ piece of the meta data to be transmitted from the data buffer to the second memory, via the data bus. The processor may be configured to control the $(N-1)^{th}$ piece of the meta data to be transmitted from the data buffer to the first memory and then to control the $N^{th}$ piece of the user data to be transmitted from the data buffer to the second memory, via the data bus.

The processor may be configured to control the $N^{th}$ piece of the user data to be stored in the first memory or the second memory, and then control the $(N-1)^{th}$ piece of the meta data, which contain information regarding the $N^{th}$ piece of the user data, to be temporarily stored in the data buffer.

The controller may include a processor configured to control transmitting of data to the memory device; and a first data buffer and a second data buffer configured to temporarily store the $N^{th}$ piece of the user data and the $(N-1)^{th}$ piece of the meta data, respectively. The memory device may further include a first data bus via which data is transmitted to the first memory; and a second data bus via which data is transmitted to the second memory.

The processor may be configured to simultaneously transmit the $N^{th}$ piece of the user data temporarily stored in the first data buffer and the $(N-1)^{th}$ piece of the meta data being temporarily stored in the second data buffer to the first memory and the second memory, respectively, via the first data bus and the second data bus.

The processor may be configured to control the $N^{th}$ piece of the user data to be stored in the first memory or the second memory, and then to control the $(N-1)^{th}$ piece of the meta data, which contains information regarding the $N^{th}$ piece of the user data, to be temporarily stored in the first or second data buffer.

The controller may be configured to store the $(N-1)^{th}$ piece of the meta data in the first or second memory that stores an $(N-1)^{th}$ piece of the user data.

The memory may be a flash memory.

According another embodiment, a storage device includes a non-volatile memory device including at least one non-volatile memory with a first plane and a second plane; and a controller configured to store data in the at least one non-volatile memory, wherein the controller is configured to one of (i) store meta data, which contains address information of previous user data stored in the at least one non-volatile memory, in the second plane when user data is stored in the first plane and (ii) store the user data in the second plane when the meta data is stored in the first plane. A time period of storing the user data partially or entirely overlaps with a time period of storing the meta data.

The controller may include a processor configured to control transmitting of data to the memory device; and a data buffer configured to temporarily store the user data and the meta data. The memory device may further include a data bus via which data is transmitted to the at least one non-volatile memory. The processor may be configured to control the user data to be transmitted from the data buffer to the first plane and then control the meta data to be transmitted from the data buffer to the second plane, via the data bus.

The processor may be configured to control the meta data to be transmitted from the data buffer to the first plane and then control the user data to be transmitted from the data buffer to the second plane, via the data bus.

The memory may be a flash memory, and the first plane and the second plane may share a word line.

In another embodiment, the memory system includes a memory device and a controller. The controller is configured to store user data and meta data in the memory device such that a time period for storing the user data at least partially overlaps with a time period for storing the meta data.

BRIEF DESCRIPTION OF THE DRAWINGS

Exemplary embodiments of the inventive concept will be more clearly understood from the following detailed description taken in conjunction with the accompanying drawings in which:

FIG. 8B is a flowchart illustrating a data storage method employed in the memory system of FIG. 7, according to another embodiment;

FIG. 9 is a diagram illustrating time periods of storing data in the memory system of FIG. 7 when the data storage method of FIG. 7 is used;

DETAILED DESCRIPTION OF THE EMBODIMENTS

Figure 1:
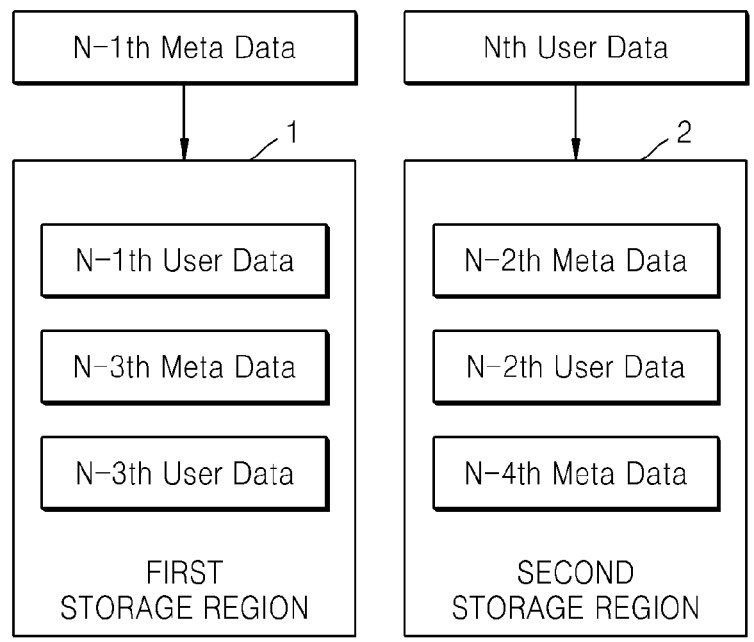
FIG. 1 is a block diagram illustrating a data storage method according to an embodiment.

Hereinafter, the inventive concepts will be described more fully with reference to the accompanying drawings, in which exemplary embodiments of the inventive concepts are shown. The inventive concepts may, however, be embodied in many different forms and should not be construed as limited to the example embodiments set forth herein. Rather, these embodiments are provided so that this disclosure will be thorough and complete, and will fully convey the scope of the invention to those of ordinary skilled in the art. The same reference numerals represent the same elements throughout the drawings.

The terminology used herein is for the purpose of describing particular embodiments only and is not intended to be limiting of the inventive concepts. As used herein, the singular forms 'a', 'an' and 'the' are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term 'and/or' includes any and all combinations of one or more of the associated listed items.

It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

FIG. 1 is a block diagram illustrating a data storage method according to an embodiment. Referring to FIG. 1, user data and meta data are stored in a first storage region 1 and a second storage region 2. The first storage region 1 and the second storage region 2 may be either memory chips or separate storage regions included in the same memory chip, but are not limited thereto. Since the user data and the meta data may be stored in the first and second storage regions 1 and 2, a time period of storing the user data may overlap with a time period of storing the meta data. For example, an $(N-1)^{th}$ piece of the meta data may be stored in the first storage region 1 and an $N^{th}$ piece of the user data may be stored in the second storage region 2. Thus, a time period of storing the $(N-1)^{th}$ piece of the meta data may partially or entirely overlap with a time period of storing the $N^{th}$ piece of the user data.

The data storage method of FIG. 1 will now be described in detail with reference to FIGS. 2 to 6.

Figure 2:
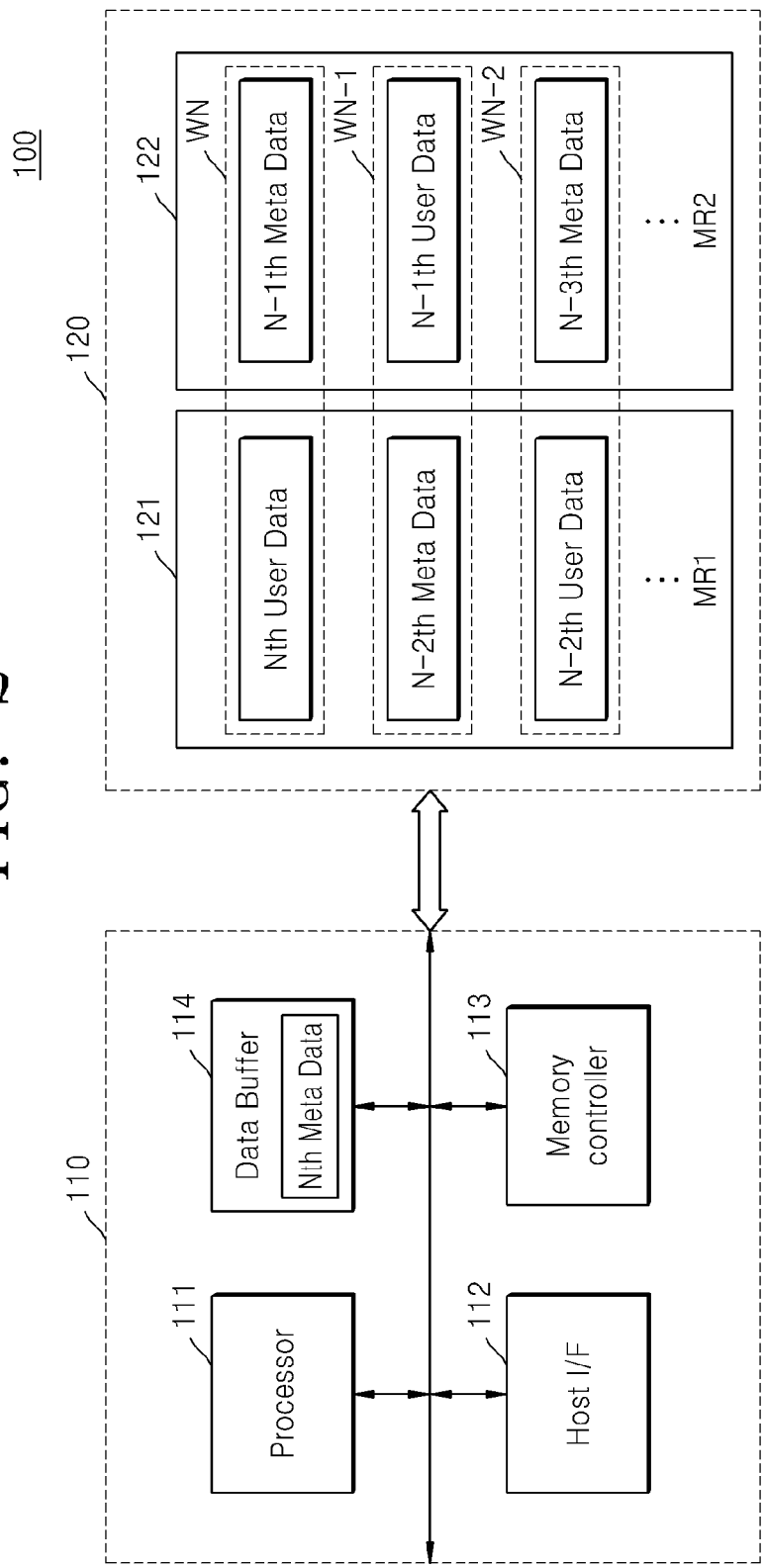
FIG. 2 is a block diagram of a memory system according to an embodiment.

FIG. 2 is a block diagram of a memory system 100 according to an embodiment. Referring to FIG. 2, the memory system 100 includes a controller 110 and a memory device 120. The memory system 100 may be a solid state drive (SSD) but is not limited thereto.

The controller 110 performs an operation in response to a command received from a host (not shown), and controls writing data to or reading data from the memory device 120.

The controller 110 includes a processor 111, a host interface (I/F) 112, a memory controller 113, and a data buffer 114.

The processor 111 is constructed to control overall operations of the controller 110. The host interface 112 includes a data exchange protocol of the host connected to the memory system 100, and connects the memory system 100 and the host to each other. The host interface 112 may be a serial advanced technology attachment (SATA) interface or a serial attached small computer system (SAS) interface but is not limited thereto.

The memory controller 113 interfaces with the memory device 110. The memory controller 113 is used to exchange, for example, a command, an address, or data with the memory device 110. That is, the memory controller 113 provides a read command and an address during a read operation, and provides a write command, an address, and data during a write operation.

The data buffer 114 temporarily stores data received from the host or data generated by the controller 110 to store the data in the memory device 120, or temporarily stores data to be transmitted to the host. Furthermore, the data buffer 114 may be used to drive firmware, such as a flash translation layer (FTL). The data buffer 114 may be embodied as dynamic random access memory (DRAM) or static RAM (SRAM).

Although not shown, it will be obvious to those of ordinary skill in the art that the memory system 100 may further include a read-only memory (ROM) that stores code data for interfacing with the host, and an error correction code (ECC) engine that that encodes data to be stored in the memory device 120 and decodes data read from the memory device 120.

The memory device 120 includes a first memory 121 and a second memory 122 that may be non-volatile memories. The first and second memories 121 and 122 may be memory chips. Although FIG. 2 illustrates that the memory device 110 includes the first and second memories 121 and 122, the inventive concepts are not limited thereto and the total number of memories included in the memory device 120 is not limited.

In the memory device 120, user data and meta data may be written to the first and second memories 121 and 122. The user data is data that is requested from the host to be stored in the memory device 120. After being written to the memory device 120, the user data may be read from the memory device 120 and provided to the host, in response to a request from the host. The meta data is data generated in the memory system 100 to manage the user data or the memory device 120. The meta data will be described in detail with reference to FIGS. 2 to 4 below.

In the memory device 120, a time period of storing the user data in the first memory 121 may partially or entirely overlap with a time period of storing the meta data in the second memory 122. Here, a time period of storing data should be understood as the sum of a time period of transmitting the data to a memory and a time period of writing the data to a cell array included in the memory (see FIG. 2).

Referring to FIG. 2, time periods for storing each of data WN, WN-1, WN-2, . . . , that are respectively written to the same rows of the first memory 121 and the second memory 122, may partially or entirely overlap with each other. For example, a time period of storing an $N^{th}$ piece of the user data in the first memory 121 may partially or entirely overlap with a time period of storing an $(N-1)^{th}$ piece of the meta data in the second memory 122. Also, a time period of storing an $(N-1)^{th}$ piece of the user data in the second memory 122 may partially or entirely overlap with a time period of storing an $(N-2)^{th}$ piece of the meta data in the first memory 121.

The first and second memories 121 and 122 may be each embodied as NAND flash memory which is a type of non-volatile memory, but the inventive concepts are not limited thereto and the first and second memories 121 and 122 may be embodied as any of the other various types of non-volatile memory.

Figure 3:
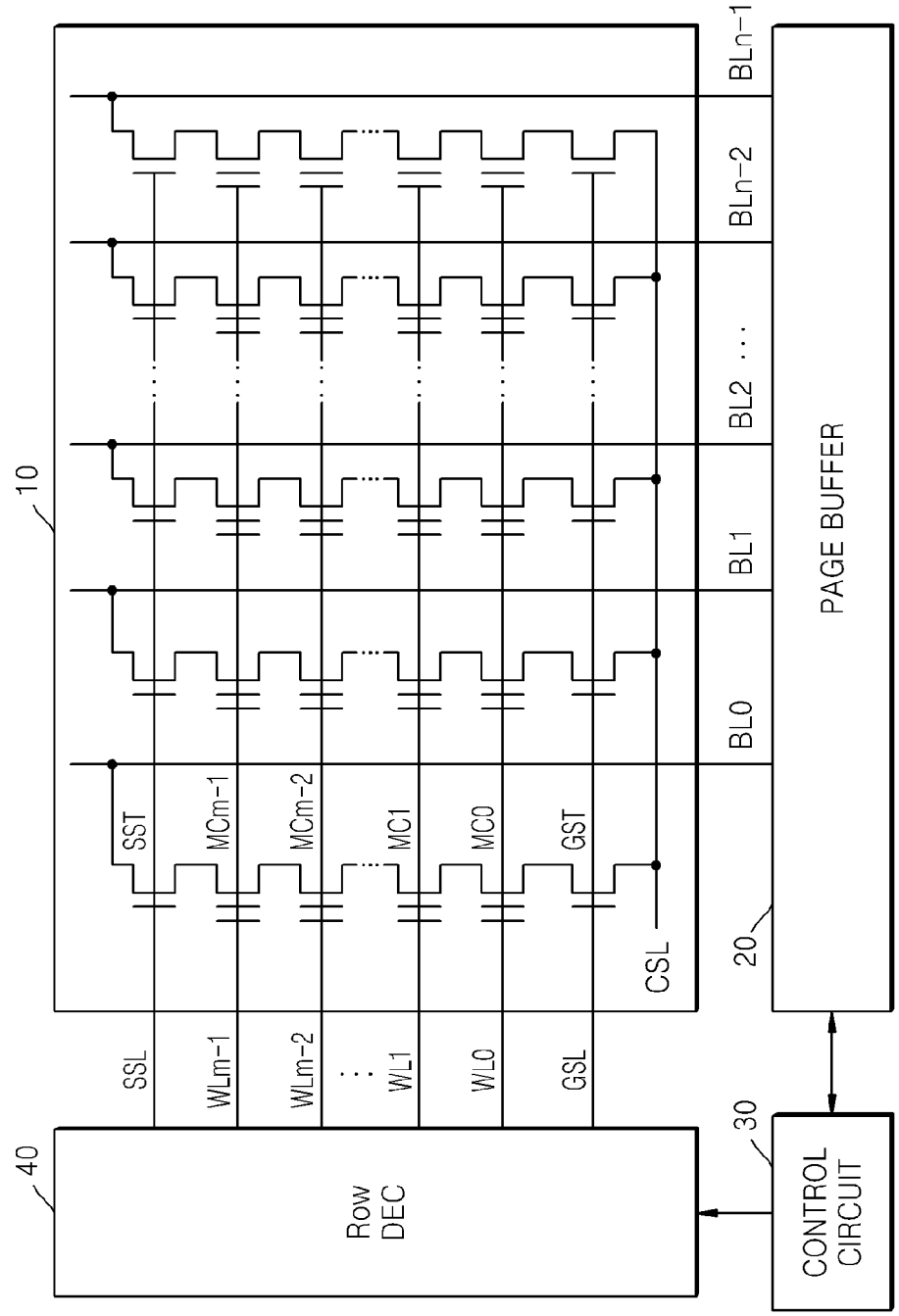
FIG. 3 is a circuit diagram of a flash memory included in the memory system of FIG. 2, according to an embodiment.

The first and second memories 121 and 122 which are NAND flash memories may each have a structure as illustrated in FIG. 3. Referring to FIG. 3, the first memory 121 of FIG. 2 which is NAND flash memory includes a cell array 10, a page buffer 20, a control circuit 30, and a row decoder 40.

In the cell array 10, data is written by applying a desired (or, alternatively a predetermined) voltage to a transistor thereof.

The cell array 10 includes memory cells formed at the intersections of word lines WL0 to WLm-1 and bit lines BL0 to BLn-1. Here, and 'n' each denotes a natural number. Although FIG. 3 illustrates that the cell array 10 includes one memory block, the cell array 10 may include a plurality of memory blocks. Each of the plurality of memory blocks includes a plurality of pages corresponding to the word lines WL0 to WLm-1. Each of the plurality of pages includes a plurality of memory cells that are each connected to one of the word lines WL0 to WLm-1.

The memory cell array 110 has a cell string structure in which each of cell strings includes a plurality of string selection transistors SST connected to a string selection line (SSL), a plurality of memory cells MC0 to MCm-1 forming a string channel where each are respectively connected to of one the plurality of word lines WL0 to WLm-1, and a plurality of ground selection transistors GST connected to a ground selection line (GSL). Each of the plurality of string selection transistors SST is connected between one of the bit lines BL0 to BLn-1 and one of string channels, and each of the plurality of ground selection transistors GST is connected between one of the string channels and a common source line (CSL).

The page buffer 20 is connected to the cell array 10 via a plurality of bit lines BL0 to BLn-1. The page buffer 20 temporarily stores data to be written to or to be read from memory cells connected to a word line selected from among the plurality of word lines WL0 to WLm-1.

The control circuit 30 generates various voltages for performing a write/read operation and an erase operation, and receives control signals CTRL and controls overall operations of the first memory 121.

The row decoder 40 is connected to the cell array 10 via the selection lines SSL and GSL and the plurality of word lines WL0 to WLm-1. During the write/read operation, the row decoder 20 receives an address, and selects a word line from among the plurality of word lines WL0 to WLm-1 according to the address. The selected word line is connected to memory cells on which the write/read operation is to be performed.

Referring to FIG. 3, in the first memory 121 which is NAND flash memory, writing or reading is performed in units of pages and electrical erasing is performed in units of blocks. Also, the blocks are electrically erased before data is written thereto. Thus, overwriting is not performed on the blocks.

In the case of a storage device to which overwriting is not performed, user data is not written to a desired physical region thereof. Thus, if a user requests to access a region of the storage device to write data thereto or read data therefrom, then a logical address is assigned to the region, a physical address is assigned to a physical region of the storage device in which data is actually stored or will be actually stored, and the logical address is mapped to the physical address.

A process of translating an address in a memory system by using a mapping table according to an embodiment will be described with reference to FIGS. 4 and 5 below.

Figure 4:
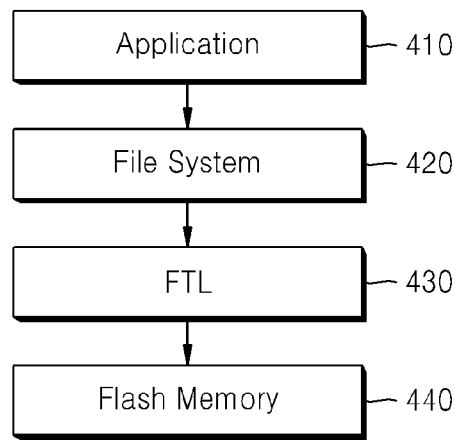
FIG. 4 is a block diagram illustrating a structure of a memory system, according to an embodiment.

FIG. 4 is a block diagram illustrating an operational structure of a memory system, according to an embodiment. FIG. 5 is a diagram illustrating a method of translating a logical address into a physical address in a memory system, according to an embodiment. Referring to FIG. 4, the memory system has a hierarchical structure in which an application 410, a file system 420, a flash translation layer (FTL) 430, and a flash memory 440 are sequentially included.

The application 410 is software executed by the processor of the host for processing user data according to a user input. For example, the application 410 may be document processing software, e.g., a word processor, calculation software, e.g., a spread sheet, or a document viewer, e.g., a web browser. The application 410 processes user data according to a user input, and provides the file system 420 with a command instructing the processed data to be stored in the flash memory 440. The application 410 may be stored in a host outside the memory system.

The file system 420 is a scheme or software used to store the user data in a storage device. The file system 420 allocates a region to the storage device, to which the user data is to be stored, in response to a command from the application 410. Examples of the file system 420 include a file allocation table (FAT) file system, a new technology file system (NTFS), and the like.

The FTL 430 receives a logical address of the user data from the application 410 or the file system 420, and translates the logical address into a physical address thereof A mapping relationship between the logical address and the physical address of the user data may be stored as meta data. The FTL 430 may obtain a mapping table representing the mapping relationship between the logical address and the physical address, from the meta data. The physical address is provided to the flash memory 440. The file system 420 and the FTL 430 are operated or executed by the processor 111 of FIG. 2.

Figure 5:
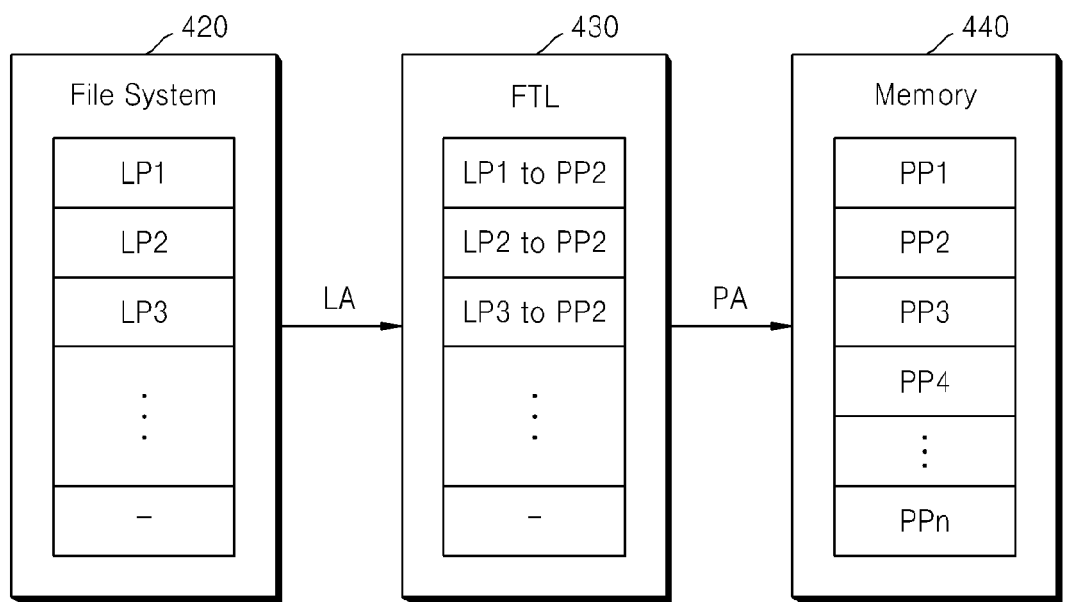
FIG. 5 is a diagram illustrating a method of translating a logical address into a physical address in a memory system, according to an embodiment.

Referring to FIG. 5, the file system 420 provides the FTL 430 with a logical address corresponding to user data to be accessed. The FTL 430 receives the logical address from the file system 420, translates the logical address into a physical address, based on a mapping table, and then provides the physical address to the flash memory 440. For example, the file system 420 may provide the FTL 430 with logical page numbers LP1 to LP3, and the FTL 430 may provide the flash memory 440 with physical page numbers PP2 to PP4, based on the mapping table. In the flash memory 440, user data may be received from a host (not shown), and may be stored in physical regions of the flash memory 440 that are assigned the physical page numbers PP2 to PP4 as physical addresses.

FIG. 5 illustrates a page mapping method according to an embodiment, but the inventive concepts are not limited to this example. For example, any of the other various mapping methods, e.g., a block mapping method and a hybrid mapping method, may be used.

Figures 6, 7:
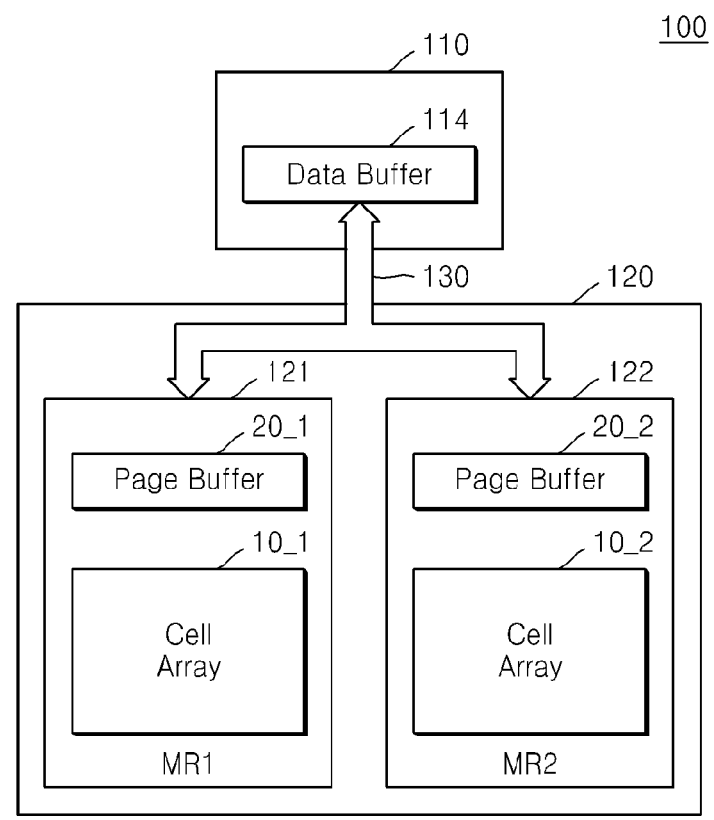
FIG. 6 is a diagram illustrating a structure of meta data generated in a memory system, according to an embodiment.
FIG. 7 is a block diagram of a memory system illustrated to explain a data storage method, according to an embodiment.

FIG. 6 is a diagram illustrating a structure of meta data generated in a memory system, according to an embodiment. The meta data is management data used to manage user data and the memory device 120 of FIG. 2. The processor 111 of FIG. 2 may efficiently manage the memory device 120, based on the meta data.

Referring to FIG. 6, the meta data includes mapping information, write count information, and physical page information but is not limited thereto.

The mapping information defines a mapping relationship between a logical address and a physical address. For example, a first logic page LP1, a second logic page LP2, and a third logic page LP3 are respectively mapped to a second physical page PP2, a third physical page PP3, and a fourth physical page PP4. The processor 111 operates the FTL 430 to translate a logical address into a physical address, based on the mapping information.

The write count information represents a number of times that writing is performed on pages in the flash memory 440 of FIG. 5. Since the total number of times that writing may be performed on the flash memory 440 is limited, the flash memory 440 is controlled in such a manner that writing cannot be frequently performed only on a particular region thereof, based on the write count information.

The physical page information represents validity of data stored in each of the pages in the flash memory 440. The processor 111 may determine whether each of the pages is valid, based on the physical page information. For example, referring back to FIG. 5, the physical page information represents that the first physical page PP1 is a valid page and the second physical page PP2 is an invalid page.

If the meta data is lost, all regions in which the user data has been stored may be scanned to detect a location of the user data stored in the flash memory 440, thereby causing inconvenience in management of the memory device 120. Thus, the meta data should be stored in a non-volatile memory so that the meta data cannot be lost even in a power off mode. The meta data may be written to the memory device 120 after the user data is written to the memory device 120 in order to reflect, for example, the location of the user data and the write count information. However, in this case, it will take a relative long time to store both the user data and the meta data. In a memory system with a non-volatile memory to which overwriting is not performed, a time period of storing the meta data is one of the factors that degrade the performance of the memory system. In at least one example embodiment, a time period of storing meta data regarding user data, which has been stored in a memory, may be controlled to overlap with a time period of storing subsequent user data, according to the data storage method of FIG. 1, thereby reducing a total time period of storing all the user data and meta data. Accordingly, it is possible to improve the performance of the memory system.

Referring back to FIGS. 2 to 5, the FTL 430 receives a logical address of user data, which is to be written in response from a request from a host, from the file system 420; allocates a physical address to a physical region to which the user data is to be written; and stores the logical address and the physical address in a mapping table. The mapping table may be included in meta data. Meta data regarding the user data is temporarily stored in the data buffer 114, and is then stored in the memory device 120.

In the memory system 100 of FIG. 2, time periods of storing user data and meta data in the first memory 121 and the second memory 122, which are physically separated from each other, are controlled to overlap with each other in order to minimize the time period of storing the meta data. For example, an $(N-1)^{th}$ piece of the meta data is stored in the second memory 122 while an $N^{th}$ piece of the user data is stored in the first memory 121. An $N^{th}$ piece of the meta data regarding the $N^{th}$ piece of the user data is temporarily stored in the data buffer 114 of the controller 110, and is stored in the second memory 122 or the first memory 121 when an $(N+1)^{th}$ piece of the user data is stored in the other of the first memory 121 or the second memory 122.

In this case, meta data may be stored in a memory in which user data corresponding to the meta data has been stored. If the user data and the meta data that contains address information of the user data are stored in the same memory, the user data may be accessed by accessing only the same memory, thereby increasing a speed of data processing. Thus, it is efficient to store meta data, which corresponds to user data stored in the first memory 121, in the first memory 121; and to store meta data, which corresponds to user data stored in the second memory 122, in the second memory 122. However, the inventive concepts are not limited thereto.

A case where data is stored in a memory system according to an embodiment of the inventive concepts via a single transmission path will be described with reference to FIGS. 7 to 9 below.

FIG. 7 is a block diagram of a memory system 100 illustrated to explain a data storage method, according to an embodiment. For convenience of explanation, a controller 110, a first memory 121, and a second memory 122 included in the memory system 100 are schematically illustrated in FIG. 7. The structures of the controller 110 and the first and second memories 121 and 122 are as described above with reference to FIGS. 2 and 3.

Referring to FIG. 7, the memory system 100 includes a data bus 130 via which data is exchanged between the controller 110 and a memory device 120. The first memory 121 and the second memory 122 receive user data or meta data from a data buffer 114 via the data bus 130. Since the first memory 121 and the second memory 122 share the data bus 130, the first memory 121 and the second memory 122 cannot simultaneously receive data. Thus, a plurality of pieces of data may be sequentially transmitted to the first and second memories 121 and 122. For example, an $N^{th}$ user data may be transmitted to the first memory 121, and then an $(N-1)^{th}$ meta data may be transmitted to the second memory 122. The $(N-1)^{th}$ meta data contains address information of an $(N-1)^{th}$ user data. The $N^{th}$ user data transmitted to the first memory 121 is temporarily stored in a page buffer 20_1 included in the first memory 121. When the $(N-1)^{th}$ meta data is transmitted to the second memory 122, the $N^{th}$ user data transmitted to the first memory 121 is written to a cell array 10_1 included in the first memory 121. After the transmission of the $(N-1)^{th}$ meta data to the second memory 122 is completed, the $(N-1)^{th}$ meta data transmitted to the second memory 122 is written to a cell array 10_2 included in the second memory 122. Thus, a time period of transmitting and writing the $(N-1)^{th}$ meta data to the second memory 122 may overlap with a time period of transmitting and writing the $N^{th}$ user data to the first memory 121.

Figure 8A:
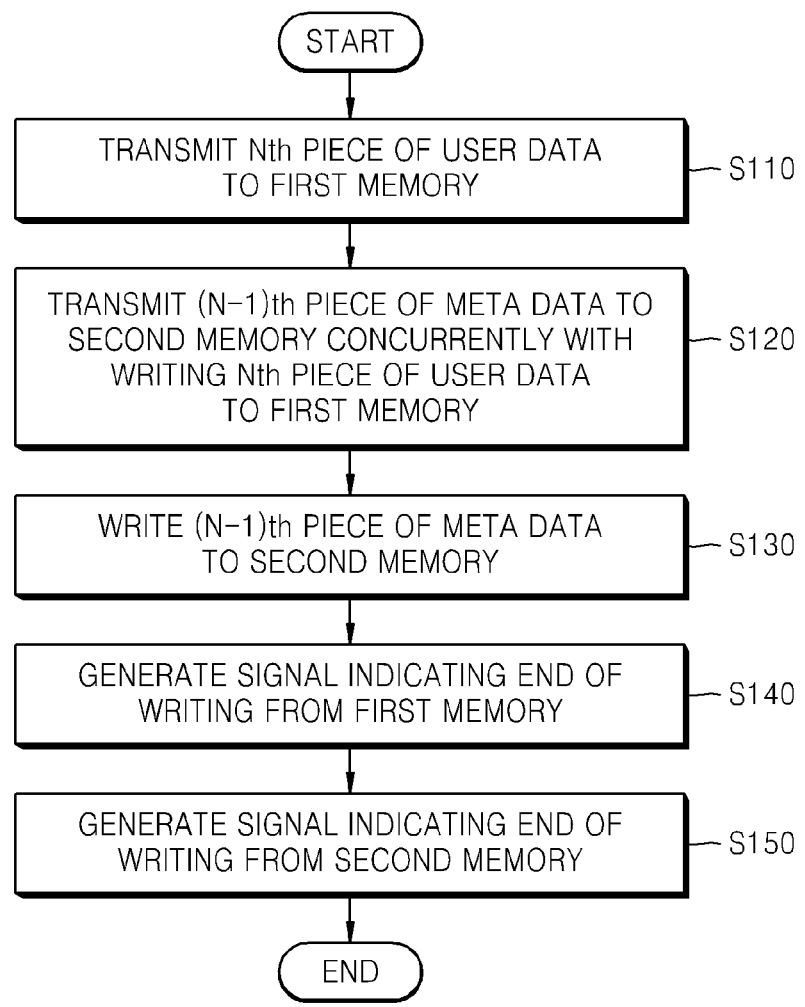
FIG. 8A is a flowchart illustrating a data storage method employed in the memory system of FIG. 7, according to an embodiment.

FIG. 8A is a flowchart illustrating a data storage method employed in the memory system 100 of FIG. 7, according to another embodiment. FIG. 8B is a flowchart illustrating a data storage method employed in the memory system 100 of FIG. 7, according to another embodiment. It is assumed that in the memory system 100, an $N^{th}$ piece of user data transmitted from a host (not shown) and an $(N-1)^{th}$ piece of meta data regarding an $(N-1)^{th}$ piece of the user data written to the memory device 120 are temporarily stored in the data buffer 114 included in the controller 110.

Specifically, FIG. 8A illustrates a data storage method performed to transmit and write the $(N-1)^{th}$ piece of the meta data while the transmission of the $N^{th}$ piece of the user data from the host is completed and the $N^{th}$ piece of the user data is written. Referring to FIG. 8A, in operation S110, the $N^{th}$ piece of the user data is transmitted to the first memory 121. The controller 110 transmits the $N^{th}$ piece of the user data to the first memory 121 via the data bus 130. The transmitted $N^{th}$ piece of the user data is temporarily stored in the page buffer 20_1 of the first memory 121.

In operation S120, the $(N-1)^{th}$ piece of the meta data is transmitted to the second memory 122 concurrently with writing the $N^{th}$ piece of the user data temporarily stored in the page buffer 20_1 to the cell array 10_1 of the first memory 121. The $(N-1)^{th}$ piece of the meta data transmitted to the second memory 122 is temporarily stored in a page buffer 20_2 of the second memory 122.

In operation S130, the $(N-1)^{th}$ piece of the meta data is written to the cell array 10_2 of the second memory 120.

In operation S140, when the writing of the $N^{th}$ piece of the user data to the first memory 121 ends, a signal indicating the end of the writing is generated from the first memory 121. In operation S150, when the writing of the $(N-1)^{th}$ piece of the meta data to the second memory 122 ends, a signal indicating the end of the writing is generated from the second memory 122. Since the writing of the $N^{th}$ piece of the user data to the first memory 121 was started earlier than the writing of the $(N-1)^{th}$ piece of the meta data to the second memory 122, the writing of the $N^{th}$ piece of the user data ends earlier than the writing of the $(N-1)^{th}$ piece of the meta data. Thus, the signal indicating the end of the writing is generated from the first memory 121 earlier than in the second memory 122. Upon receiving these signals from the first memory 121 and the second memory 122, the controller 110 controls the memory device 120 to store an $(N+1)^{th}$ piece of the user data and an $N^{th}$ piece of the meta data.

Specifically, FIG. 8B illustrates a data storage method performed to transmit and write the $N^{th}$ piece of the user data while the transmission of the $(N-1)^{th}$ piece of the meta data is completed and the $(N-1)^{th}$ piece of the meta data is written. Referring to FIG. 8B, in operation S110_a, the $(N-1)^{th}$ piece of the meta data is transmitted to the first memory 121. In this case, the transmitted $(N-1)^{th}$ piece of the meta data is temporarily stored in the page buffer 20_1 of the first memory 121.

In operation S120_a, the $N^{th}$ piece of the user data is transmitted to the second memory 122 concurrently with writing the $(N-1)^{th}$ piece of the meta data temporarily stored in the page buffer 20_1 to the cell array 10_1 of the first memory 121. The $N^{th}$ piece of the user data transmitted to the second memory 122 is temporarily stored in the page buffer 20_2 of the second memory 122.

In operation S130_a, the $N^{th}$ piece of the user data is written to the cell array 10_2 of the second memory 120.

In operation S140_a, when the writing of the $(N-1)^{th}$ piece of the meta data to the first memory 121 ends, a signal indicating the end of the writing is generated from the first memory 121. In operation S150_a, when the writing of the $N^{th}$ piece of the user data to the second memory 122 ends, a signal indicating the end of the writing is generated from the second memory 122. Since the writing of the $(N-1)^{th}$ piece of the meta data to the first memory 121 was started earlier than the writing of the $N^{th}$ piece of the user data to the second memory 122, the writing of the $(N-1)^{th}$ piece of the meta data ends earlier than the writing of the $N^{th}$ piece of the user data. Thus, the signal indicating the end of the writing is generated from the first memory 121 earlier than in the second memory 122. Upon receiving these signals from the first memory 121 and the second memory 122, the controller 110 controls the memory device 120 to store an $N^{th}$ piece of the meta data and an $(N+1)^{th}$ piece of the user data.

FIG. 9 is a diagram illustrating time periods of storing data in the memory system 100 of FIG. 7 when the method of FIG. 7 is used. Referring to FIG. 9, after an $N^{th}$ piece of user data is transmitted to the first memory 121, an $(N-1)^{th}$ piece of meta data is transmitted to the second memory 122 concurrently with writing the $N^{th}$ piece of the user data to the first memory 121. Since writing is performed on a flash memory in units of pages, if it is assumed that time periods of writing data to the first memory 121 and the second memory 122 are the same, then writing of the $(N-1)^{th}$ piece of the meta data to the second memory 122 ends after a time period t1, which corresponds to the time period of transmitting the $(N-1)^{th}$ piece of the meta data, after writing of the $N^{th}$ piece of the user data to the first memory 121 ends. Thus, a host (not shown) may recognize the time period t1 that is a result of subtracting the time period of storing the $N^{th}$ piece of the user data in the first memory 121, which overlaps with the time period of storing the $(N-1)^{th}$ piece of the meta data in the second memory 122, from the time period of storing the $(N-1)^{th}$ piece of the meta data in the second memory 122, as an actual time period of storing the $(N-1)^{th}$ piece of the meta data.

Next, a case where data is stored in a memory system according to another embodiment via a plurality of transmission paths will now be described with reference to FIGS. 10 to 12.

Figure 10:
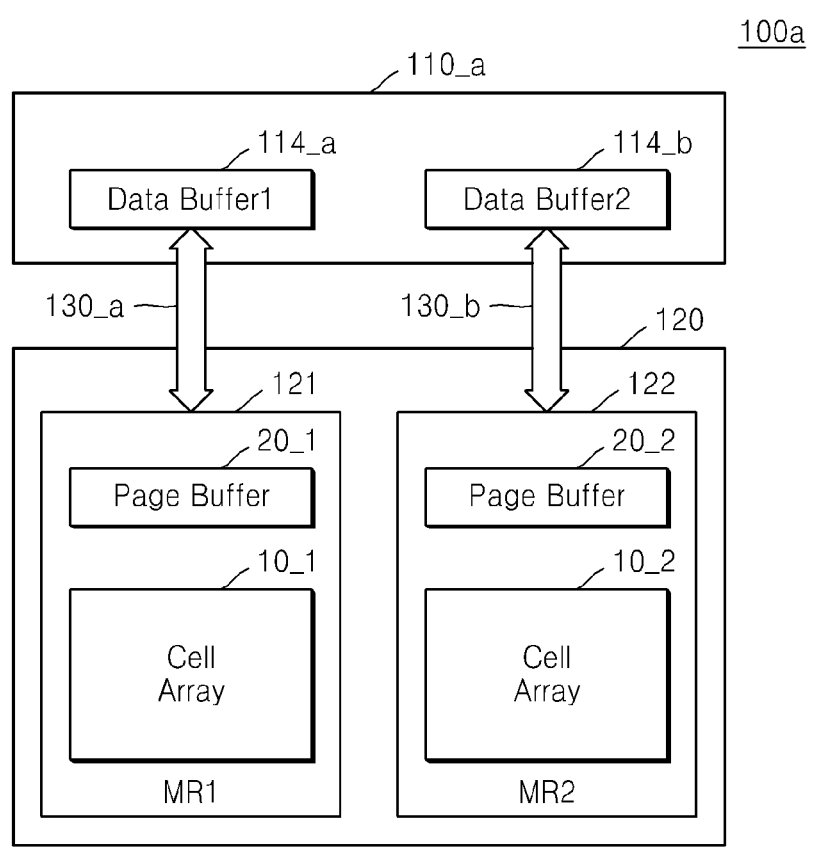
FIG. 10 is a block diagram of a memory system illustrated to explain a data storage method according to another embodiment.

FIG. 10 is a block diagram of a memory system 100a illustrated to explain a data storage method according to another embodiment. Referring to FIG. 10, the memory system 100_a includes a controller 110_a and a memory device 120. The memory system 100_a further includes a first data bus 130_a and a second data bus 130_b between the controller 110_a and the memory device 120, via which data is exchanged between the controller 110_a and a memory device 120. FIG. 10 illustrates that the controller 110_a includes two data buses but the inventive concepts are not limited thereto.

The controller 110_a includes a first data buffer 114_a and a second data buffer 114_b. The first data buffer 114_a may transmit data to the first memory 121 via the first data bus 130_a, and the second data buffer 114_b may transmit data to the second memory 122 via the second data bus 130_b. In other words, the first memory 121 and the second memory 122 may simultaneously receive data via different data buses without having to share the same data bus. For example, if in the controller 110_a, an $N^{th}$ piece of user data temporarily stored in the first data buffer 114_a and an $(N-1)^{th}$ piece of meta data temporarily stored in the second data buffer 114_b are respectively stored in the first memory 121 and the second memory 122, then the $N^{th}$ piece of the user data may be transmitted to the first memory 121 via the first data bus 130_a, and concurrently, the $(N-1)^{th}$ piece of the meta data may be transmitted to the second memory 122 via the second data bus 130_b. After the transmission ends, the $N^{th}$ piece of the user data and the $(N-1)^{th}$ piece of the meta data are respectively written to a cell array 10_1 of the first memory 121 and a cell array 10_2 of the second memory 122.

FIG. 10 illustrates that the first data bus 130_a is located between the first data buffer 114_a and the first memory 121 and the second data bus 130_b is located between the second data buffer 114_b and the second memory 122. This illustration is intended to represent that the first memory 121 and the second memory 122 may receive data via different data buses. Thus, it should not be understood that the first memory 121 may receive data from only the first data buffer 114_a and the second memory 122 may receive data from only the second data buffer 114_b. In other words, if the first memory 121 receives data from the first data buffer 114 a via the first data bus 130_a, then the second memory 122 may simultaneously receive data from the second data buffer 114_b via the second data bus 130_b. If the first memory 121 receives data from the second data buffer 114_b via the first data bus 130_a, then the second memory 122 may simultaneously receive data from the first data buffer 114_a via the second data bus 130_b.

Figure 11:
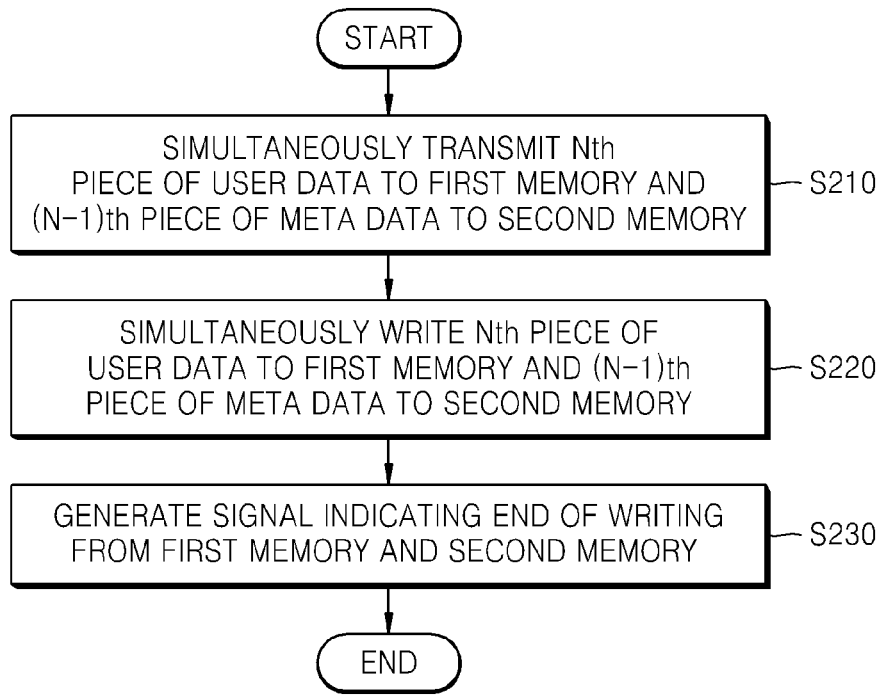
FIG. 11 is a flowchart illustrating a data storage method employed in the memory system of FIG. 10, according to another embodiment.

FIG. 11 is a flowchart illustrating a data storage method employed in the memory system 100a of FIG. 10, according to another embodiment. Referring to FIG. 11, in operation S210, an $(N-1)^{th}$ piece of meta data is transmitted to the second memory 122 concurrently with transmitting an $N^{th}$ piece of user data to the first memory 121. For example, referring to FIG. 10, if the $N^{th}$ piece of the user data is received from the first data buffer 114_a and the $(N-1)^{th}$ piece of the meta data is received from the second data buffer 114_b, then the first memory 121 and the second memory 122 may respectively receive the $N^{th}$ piece of the user data and the $(N-1)^{th}$ piece of the meta data via different data buses, e.g., the first and second data buses 130_a and 130_b, without having to share the same data bus. The first memory 121 may receive the $N^{th}$ piece of the user data from the first data buffer 114_a and the second memory 122 may receive the $(N-1)^{th}$ piece of the meta data from the second data buffer 114_b. The transmission of the $N^{th}$ piece of the user data and the $(N-1)^{th}$ piece of the meta data to the first memory 121 and the second memory 122 may be simultaneously performed.

In operation S220, the $N^{th}$ piece of the user data and the $(N-1)^{th}$ piece of the meta data are respectively written to the first memory 121 and the second memory 122. That is, the $N^{th}$ piece of the user data and the $(N-1)^{th}$ piece of the meta data received in operation S210 are simultaneously written to the first memory 121 and the second memory 122.

In operation S230, a signal indicating an end of the writing is generated from each of the first memory 121 and the second memory 122. Since the writing is simultaneously performed on the first memory 121 and the second memory 122 in units of pages, the writing simultaneously ends in both the first memory 121 and the second memory 122.

Figure 12:
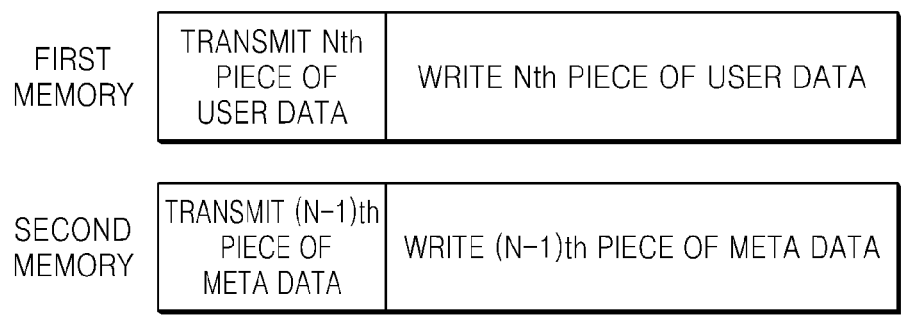
FIG. 12 is a diagram illustrating time periods of storing data in the memory system of FIG. 7 when the data storage method of FIG. 10 is used.

FIG. 12 is a diagram illustrating time periods of storing data in the memory system 100a of FIG. 10 when the method of FIG. 10 is used. It is assumed in FIG. 12 that a time period of transmitting data of a page and a time period of writing the data are the same for all memories. Referring to FIG. 12, in the first memory 121 and the second memory 122, a point of time when data is transmitted, a point of time when the data is written, and a point of time when the writing ends are the same. In other words, a time period of storing an $(N-1)^{th}$ piece of meta data in the second memory 122 entirely overlaps with a time period of storing an $N^{th}$ piece of user data in the first memory 121. Thus, a host (not shown) may recognize only the time period of storing the user data and cannot recognize the time period of storing the meta data.

Next, a case where data is stored in a memory system in which a memory includes a plurality of independent storage regions, according to another embodiment, will be described with reference to FIGS. 13 to 15 below.

Figure 13:
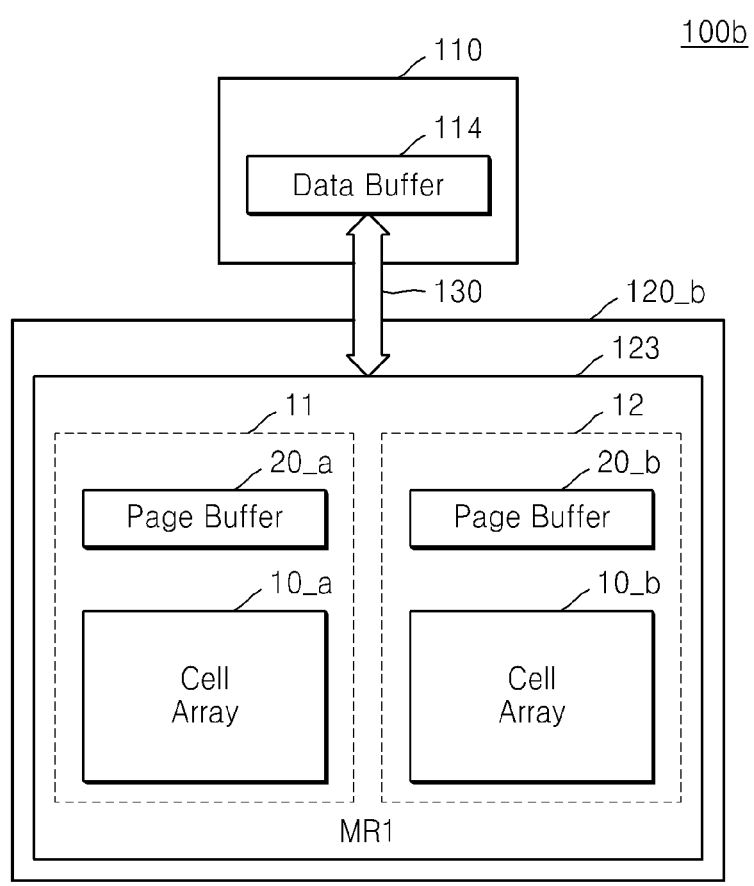
FIG. 13 is a block diagram of a memory system illustrated to explain a data storage method according to another embodiment.

FIG. 13 is a block diagram of a memory system 100b illustrated to explain a data storage method according to another embodiment. Referring to FIG. 13, the memory system 100_b includes a controller 110, a memory device 120_b, and a data bus 130. The memory device 120_b includes a memory 123 with a first plane 11 and a second plane 12, which are independent storage regions. The memory 123 may be one memory chip. Since the first plane 11 and the second plane 12 are dependent storage regions in the memory 123, which is a memory chip, a plurality of pieces of data may be simultaneously written to the first plane 11 and the second plane 12 by sharing a data transmission terminal of the memory 123. If the memory 123 is a NAND type flash memory, the first plane 11 and the second plane 12 may be storage regions of the memory 123 to which a plurality of pieces of data are simultaneously written thereto by sharing a word line. Although FIG. 13 illustrates that the memory device 120_b includes one memory 123 and the memory 123 includes two planes 11 and 12, the inventive concepts are not limited thereto.

The first plane 11 includes a page buffer 20_a and a cell array 10_a, and the second plane 12 includes a page buffer 20_b and a cell array 10_b. Thus, a plurality of pieces of data may be respectively transmitted and written to the first and second planes 11 and 12. Since the first plane 11 and the second plane 12 are included in the memory 123, the first and second planes 11 and 12 receive user data or meta data from a data buffer 114 via a data bus 130. Since the first and second planes 11 and 12 share the data bus 130, the first and second planes 11 and 12 cannot simultaneously receive data via the data bus 130. For example, in order to store an $N^{th}$ piece of user data and an $(N-1)^{th}$ piece of meta data in the first and second planes 11 and 12, the controller 110 may transmit the $N^{th}$ piece of the user data to the first plane 11 arid then transmit the $(N-1)^{th}$ piece of the meta data to the second plane 12, or may transmit the $(N-1)^{th}$ piece of the meta data to the second plane 12 and then transmit to the $N^{th}$ piece of the user data to the first plane 11. Then, the $N^{th}$ piece of the user data and the $(N-1)^{th}$ piece of the meta data are respectively and temporarily stored in page buffers 20_a and 20_b. Thereafter, the $N^{th}$ piece of the user data and the $(N-1)^{th}$ piece of the meta data are respectively and simultaneously written to the cell array 10_a of the first plane 11 and the cell array 10_b of the second plane 12. Accordingly, a time period of writing the $N^{th}$ piece of the user data may overlap with a time period of writing the $(N-1)^{th}$ piece of the meta data.

Figure 14A:
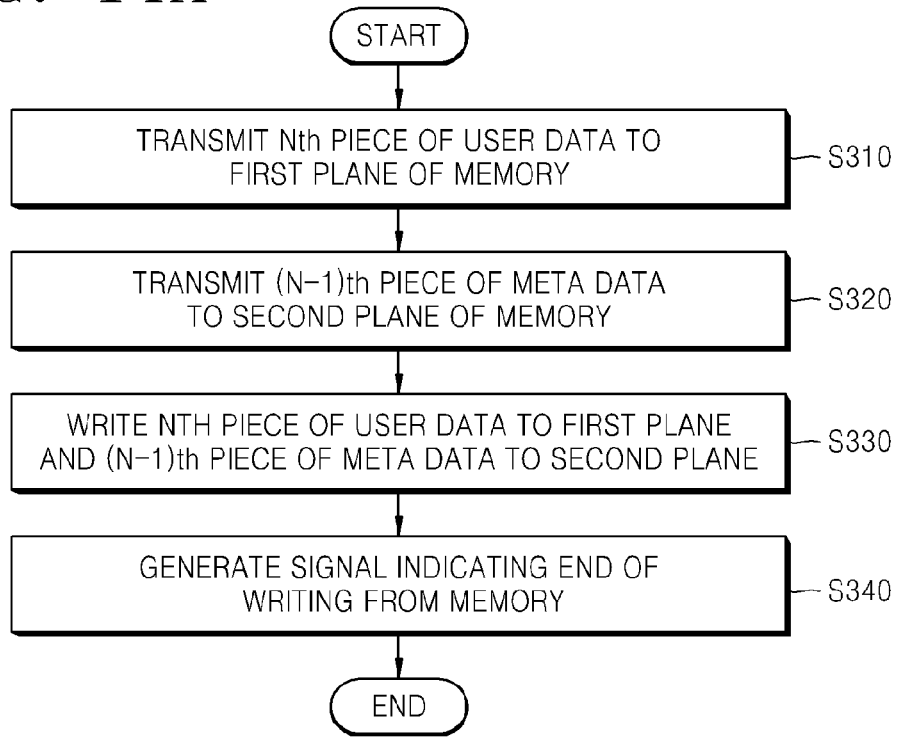
FIG. 14A is a flowchart illustrating a data storage method employed in the memory system of FIG. 13, according to another embodiment.
Figure 14B:
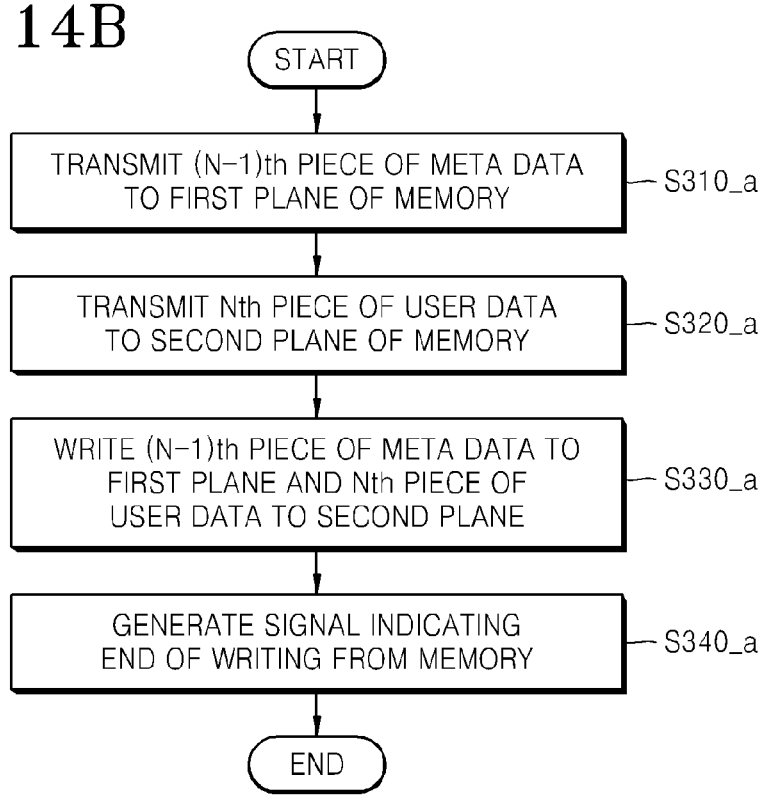
FIG. 14B is a flowchart illustrating the data storage method employed in the memory system of FIG. 13, according to another embodiment.

FIG. 14A is a flowchart illustrating a data storage method employed in the memory system 100b of FIG. 13, according to another embodiment FIG. 14B is a flowchart illustrating the data storage method employed in the memory system 100b of FIG. 13, according to another embodiment.

Specifically, FIG. 14A illustrates a data storage method in which an $(N-1)^{th}$ piece of meta data is transmitted after transmission of an $N^{th}$ piece of user data ends. Referring to FIG. 14A, in operation S310, the $N^{th}$ piece of the user data is transmitted to the first plane 11 of the memory 123. The controller 110 of FIG. 13 transmits the $N^{th}$ piece of the user data to the first plane 11 via the data bus 130. The transmitted $N^{th}$ piece of the user data is temporarily stored in the page buffer 20_a of the first plane 11.

In operation S320, the $(N-1)^{th}$ piece of the meta data is transmitted to the second plane 12 of the memory 123. The transmitted $(N-1)^{th}$ piece of the meta data is temporarily stored in the page buffer 20_b of the second plane 12.

In operation S330, the $N^{th}$ piece of the user data and the $(N-1)^{th}$ piece of the meta data are respectively written to the cell array 10_a of the first plane 11 and the cell array 10_b of the second plane 12.

In operation S340, after the writing of the $N^{th}$ piece of the user data and the $(N-1)^{th}$ piece of the meta data to the first plane 11 and the second plane 12 ends, a signal indicating the end of the writing is generated from the memory 123. Then, the controller 110 controls the memory device 120_b to store an $(N+1)^{th}$ piece of the user data and an $N^{th}$ piece of the meta data, according to this signal.

FIG. 14B illustrates a data storage method in which an $N^{th}$ piece of user data is transmitted after transmission of an $(N-1)^{th}$ piece of meta data ends. Referring to FIG. 14B, in operation S310_a, the $(N-1)^{th}$ piece of the meta data is transmitted to the first plane 11 of the memory 123. The transmitted $(N-1)^{th}$ piece of the meta data is temporarily stored in the page buffer 20_a of the first plane 11.

In operation S320_a, the $N^{th}$ piece of the user data is transmitted to the second plane 12 of the memory 123. The transmitted $N^{th}$ piece of the user data is temporarily stored in the page buffer 20_b of the second plane 12.

In operation S330_a, the $(N-1)^{th}$ piece of the meta data and the $N^{th}$ piece of the user data are respectively written to the cell array 10_a of the first plane 11 and the cell array 10_b of the second plane 12.

In operation S340_a, after the writing of the $(N-1)^{th}$ piece of the meta data and the $N^{th}$ piece of the user data to the first plane 11 and the second plane 12 ends, a signal indicating the end of the writing is generated from the memory 123. Then, the controller 110 controls the memory device 120_b to store an $(N+1)^{th}$ piece of the user data and an $N^{th}$ piece of the meta data, according to this signal.

Figure 15:
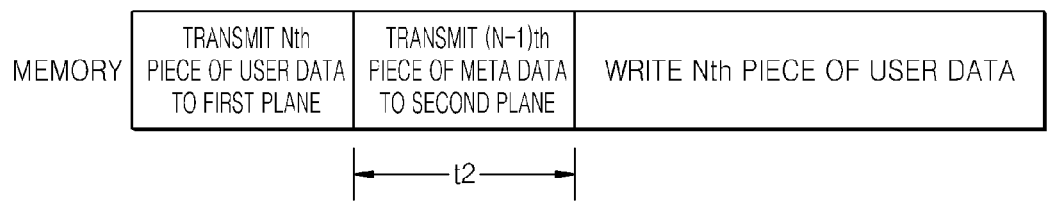
FIG. 15 is a diagram illustrating time periods of storing data in the memory system of FIG. 13 when the method data storage of FIG. 13 is used.

FIG. 15 is a diagram illustrating time periods of storing data in the memory system of FIG. 13 when the method data storage 100b of FIG. 13 is used. Referring to FIG. 15, after an $N^{th}$ piece of user data is transmitted to the first plane 11, an $(N-1)^{th}$ piece of meta data is transmitted to the second plane 12. If the transmission of the $(N-1)^{th}$ piece of the meta data to the second plane 12 ends, then the $N^{th}$ piece of the user data and the $(N-1)^{th}$ piece of the meta data are respectively written to the first and second planes 11 and 12 of the memory 123. The writing of the $N^{th}$ piece of the user data and the $(N-1)^{th}$ piece of the meta data means that the $N^{th}$ piece of the user data temporarily stored in the page buffer 20_a and the $(N-1)^{th}$ piece of the meta data temporarily stored in the page buffer 20_b are respectively written to the cell arrays 10_a and 10_b. In the current embodiment, a time period of transmitting the $N^{th}$ piece of the user data to the first plane 11 does not overlap with a time period t2 of transmitting and the $(N-1)^{th}$ piece of the meta data to the second plane 12 but a time period of writing and the $N^{th}$ piece of the user data to the first plane 11 entirely overlaps with a time period of writing the $(N-1)^{th}$ piece of the meta data to the second plane 12. Thus, a host (not shown) may recognize the time period of writing the $N^{th}$ piece of the user data but cannot recognize the time period of writing the $(N-1)^{th}$ piece of the meta data. Thus, only the time period t2 of transmitting the $(N-1)^{th}$ piece of the meta data may be recognized as a time period of storing the $(N-1)^{th}$ piece of the meta data.

If the time period of transmitting each of the $N^{th}$ piece of the user data and the $(N-1)^{th}$ piece of the meta data illustrated in FIG. 9 is the same as that illustrated in FIG. 15, then the time period t 1 of FIG. 9 and the time period t2 may be the same. Thus, the time period of storing the $(N-1)^{th}$ piece of the meta data illustrated in FIG. 9, which is recognized by the host, may be equal to that illustrated in FIG. 15, which is recognized by the host.

Figure 16:
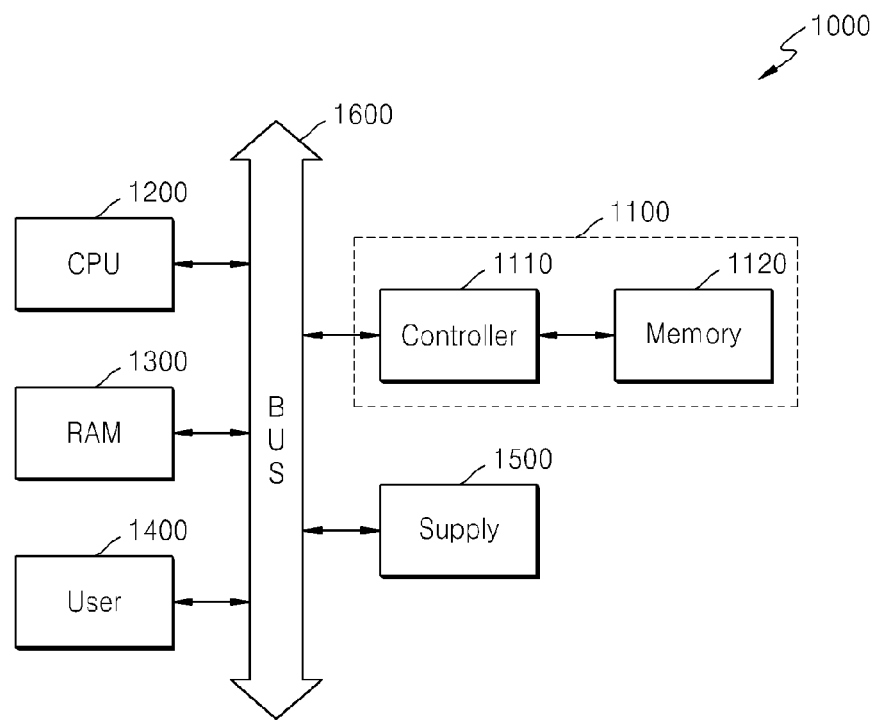
FIG. 16 is a block diagram of a computing system apparatus according to an embodiment.

FIG. 16 is a block diagram of a computing system apparatus 1000 according to an embodiment. The computing system apparatus 1000 includes a processor 1200, a memory 1300, a user interface 1400, and a semiconductor memory system 1100 that are electrically connected via a bus 1600. The semiconductor memory system 1100 includes a memory controller 1110 and a memory device 1120. Data that was processed or will be processed by the processor 1200 is stored in the memory device 1120 by the memory controller 1110. The memory device 1120 and the controller 1110 included in the memory system apparatus 1100 of FIG. 16 may correspond to the memory system 100 of FIG. 2. The computing system apparatus 1000 may further include a power supply device 1500.

If the computing system apparatus 1000 is a mobile apparatus, the power supply device 1500 that applies an operating voltage to the computing system apparatus 1000 may be a battery. Also, a modem, such as a baseband chipset, may further be provided. It will be obvious to those of ordinary skill in the art that the computing system apparatus 1000 may further include an application chipset, a camera image processor (CIS), a mobile DRAM, and the like.

Figure 17:
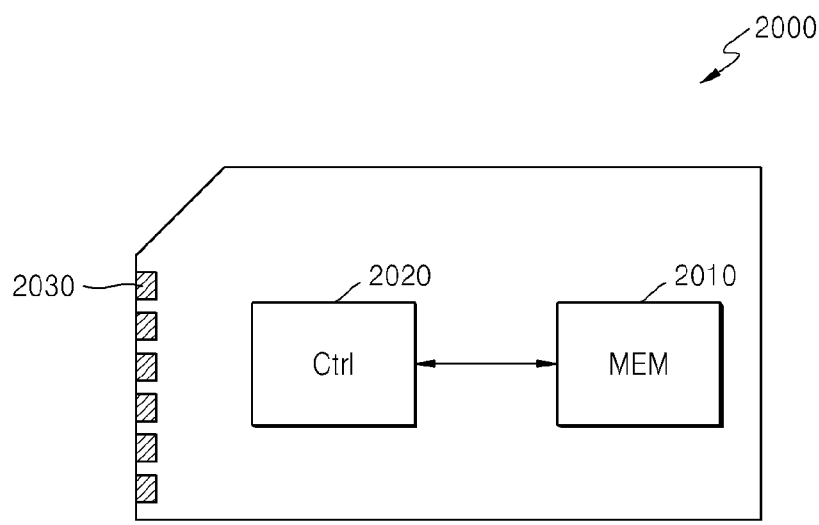
FIG. 17 is a block diagram of a memory card according to an embodiment.

FIG. 17 is a block diagram of a memory card 2000 according to an embodiment. Referring to FIG. 17, the memory card 2000 includes a controller 2020 and a memory device 2010. The controller 2020 controls data to be written to or read from the memory device 2010, in response to a request received from an external host (not shown) via an input/output (I/O) unit 2030. To this end, the controller 2020 of the memory card 2000 may include interfaces (not shown) for interfacing between the external host and the memory device 2010, and an RAM. The memory card 2000 may be embodied as the memory system 100 of FIG. 2.

Furthermore, the memory card 2000 of FIG. 17 may be embodied as a compact flash card (CFC), a microdrive, a smart media card (SMC), a multimedia card (MMC), a security digital card (SDC), a memory stick, a universal serial bus (USB) flash memory driver, or the like.

Figure 18:
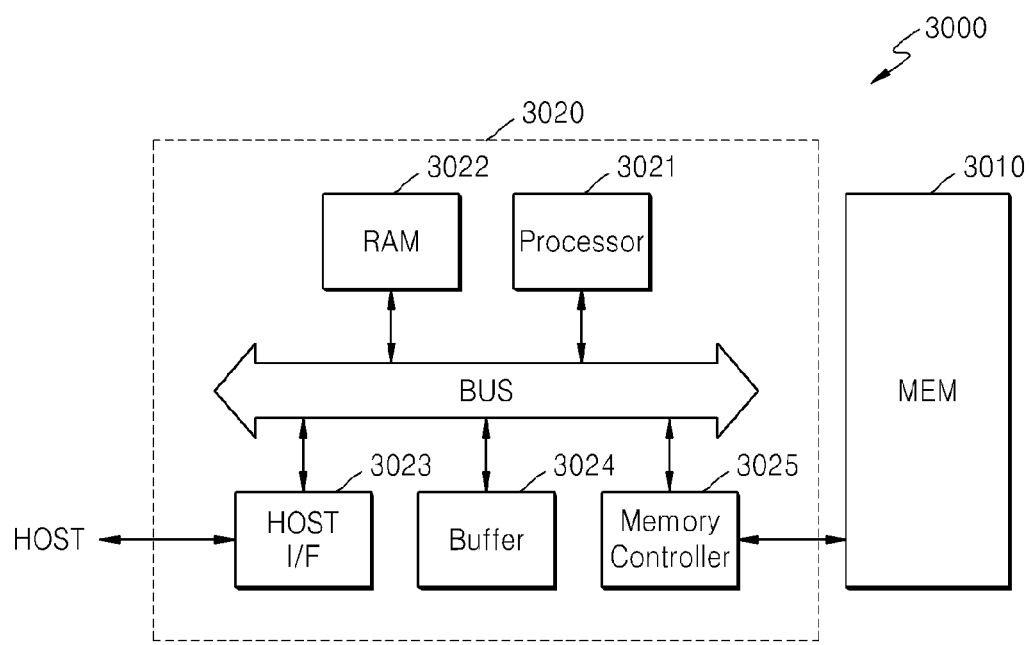
FIG. 18 is a block diagram of a solid state drive (SSD) according to an embodiment.

FIG. 18 is a block diagram of a solid state drive (SSD) according to an embodiment. Referring to FIG. 18, the SSD 3000 includes an SSD controller 3020 and a memory device 3010. The SSD controller 3020 may include a processor 3021, a RAM 3022, a host interface 3023, a cache buffer 3024, and a memory controller 3025. The processor 3021 controls the memory controller 3025 to exchange data with the memory device 3010, in response to a request (command, address, or data) from an external host (not shown). The processor 3021 and the memory controller 3025 may be embodied as one advanced risc machine (ARM) processor together. Data to operate the processor 3021 may be loaded into the RAM 3022.

The host interface 3023 may receive a request from the external host and provide it to the processor 3022 or may transmit data received from the memory device 3010 to the external host. The host interface 3023 may interface with the external host by using any of various interface protocols, e.g., a USB, a man machine communication (MMC), a peripheral component interconnect-express (PCI-E), a serial advanced technology attachment (SATA), a parallel advanced technology attachment (PATA), a small computer system interface (SCSI), an enhanced small device interface (ESDI), and an intelligent drive electronics (IDE). Data that is to be transmitted to or received from the memory device 3010 may be temporarily stored in the cache buffer 3024. The cache buffer 3024 may be an SRAM.

Figure 19:
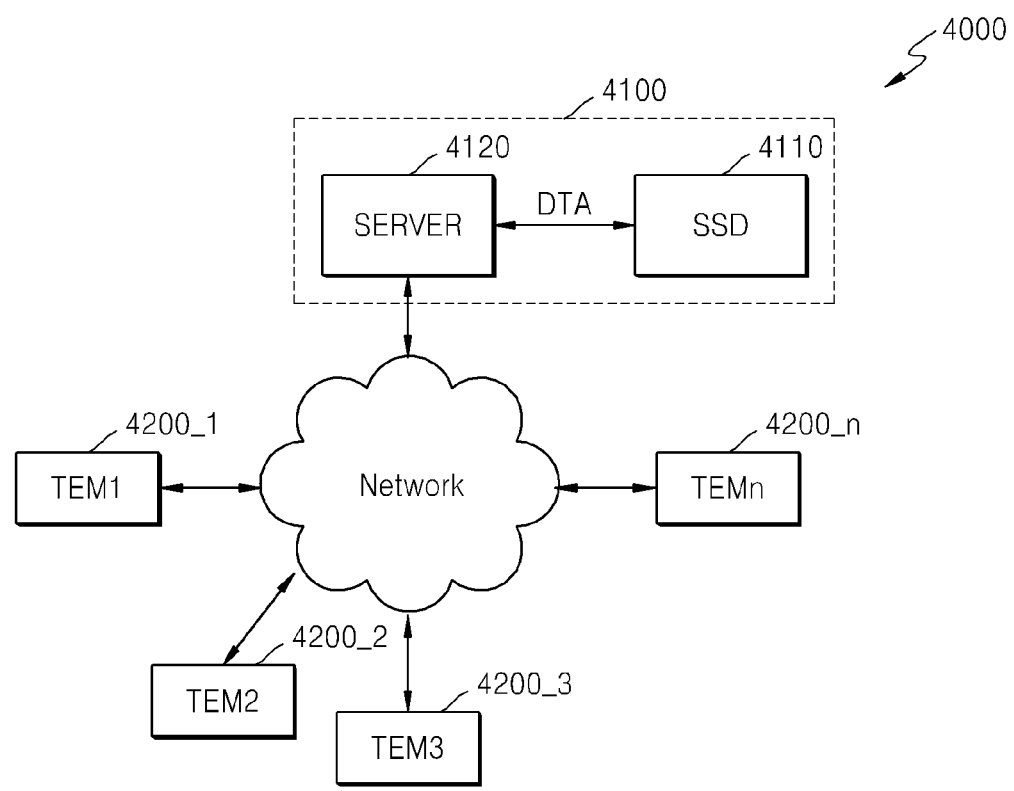
FIG. 19 is a diagram illustrating a server system that includes an SSD and a network system that includes the server system, according to an embodiment.

FIG. 19 is a diagram illustrating a server system including an SSD and a network system including the server system, according to an embodiment. Referring to FIG. 19, the network system 4000 may include the sever system 4100 and a plurality of terminals 4200_1 to 4200_n that are connected via a network. The server system 4100 may include a server 4120 that processes requests from the plurality of terminals 4200_1 to 4200_n connected thereto via a network. The server system 4100 may also include the SSD 4110 that stores a plurality of pieces of data corresponding to the requests from the plurality of terminals 4200_1 to 4200_n. The SSD 4110 of FIG. 19 may correspond to the SSD 3000 of FIG. 18. That is, the SSD 4110 of FIG. 19 may include the SSD controller 3020 and the memory device 3010 illustrated in FIG. 18, and may store data according to the data storage method of FIG. 1.

A flash memory system according to the one or more embodiments of the inventive concepts may be mounted using any of various types of packages, e.g., a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline (SOIC), a shrink small outline package (SSOP), a thin small outline (TSOP), a thin quad flatpack (TQFP), a system in package (SIP), a multi chip package (MCP), a wafer-level fabricated package (WFP), and a wafer-level processed stack package (WSP).

While the inventive concepts have been particularly shown and described with reference to exemplary embodiments thereof, it will be understood that various changes in form and details may be made therein without departing from the spirit and scope of the following claims.

What is claimed is:
1. A memory system, comprising:
    a memory device including a first memory and a second memory; and
    a controller configured to control storing of data in the memory device such that the controller controls an $(N-1)^{th}$ piece of meta data to be stored in the second memory when an $N^{th}$ piece of user data is stored in the first memory or controls the Nth piece of the user data to be stored in the second memory when the $(N-1)^{th}$ piece of the meta data is stored in the first memory, where N denotes a natural number equal to or greater than '1', and a time period of storing the $N^{th}$ piece of the user data partially or entirely overlaps with a time period of storing the $(N-1)^{th}$ piece of the meta data.

2. The memory system of claim 1, wherein the $(N-1)^{th}$ piece of the meta data includes mapping information between a logical address and a physical address of the $(N-1)^{th}$ piece of the meta data.

3. The memory system of claim 1, wherein the controller comprises:
    a processor configured to control transmitting of data to the memory device; and
    a data buffer configured to temporarily store the Nth piece of the user data and the $(N-1)^{th}$ piece of the meta data,
    wherein the memory device further includes a data bus via which data is transmitted to the first memory and the second memory.

4. The memory system of claim 3, wherein the processor is configured to control the Nth piece of the user data to be transmitted from the data buffer to the first memory and then to control the $(N-1)^{th}$ piece of the meta data to be transmitted from the data buffer to the second memory, via the data bus.

5. The memory system of claim 3, wherein the processor is configured to control the $(N-1)^{th}$ piece of the meta data to be transmitted from the data buffer to the first memory and then to control the $N^{th}$ piece of the user data to be transmitted from the data buffer to the second memory, via the data bus.

6. The memory system of claim 3, wherein the processor is configured to control the Nth piece of the user data to be stored in the first memory or the second memory, and then to control the $(N-1)^{th}$ piece of the meta data, which contains information regarding the Nth piece of the user data, to be temporarily stored in the data buffer.

7. The memory system of claim 1, wherein the controller comprises:
    a processor configured to control transmitting of data to the memory device; and
    a first data buffer and a second data buffer configured to temporarily store the $N^{th}$ piece of the user data and the $(N-1)^{th}$ piece of the meta data, respectively; and
    the memory device includes,
        a first data bus via which data is transmitted to the first memory; and
        a second data bus via which data is transmitted to the second memory.

8. The memory system of claim 7, wherein the processor is configured to simultaneously transmit the Nth piece of the user data temporarily stored in the first data buffer and the $(N-1)^{th}$ piece of the meta data temporarily stored in the second data buffer to the first memory and the second memory, respectively, via the first data bus and the second data bus.

9. The memory system of claim 7, wherein the processor is configured to control the $N^{th}$ piece of the user data to be stored in the first memory or the second memory, and then to control the $(N-1)^{th}$ piece of the meta data, which contains information regarding the $N^{th}$ piece of the user data, to be temporarily stored in the first or second data buffer.

10. The memory system of claim 1, wherein the controller is configured to store the $(N-1)^{th}$ piece of the meta data in the first or second memory that stores an $(N-1)^{th}$ piece of the user data.

11. A storage device comprising:
a non-volatile memory device including at least one non-volatile memory with a first plane and a second plane; and
a controller configured to store data in the at least one non-volatile memory, the controller configured to one of (i) store meta data, which contains address information of previous user data stored in the at least one non-volatile memory in the second plane when user data is stored in the first plane and (ii) store the user data in the second plane when the meta data is stored in the first plane, and a time period of storing the user data partially or entirely overlapping with a time period of storing the meta data.

12. The storage device of claim 11, wherein the controller comprises:
a processor configured to control transmitting of data to the memory device; and
a data buffer configured to temporarily store the user data and the meta data; wherein
the memory device further includes, a data bus via which data is transmitted to the at least one non-volatile memory, and
the processor is configured to control the user data to be transmitted from the data buffer to the first plane and then is configured to control the meta data to be transmitted from the data buffer to the second plane, via the data bus.

13. The storage device of claim 12, wherein the processor is configured to control the meta data to be transmitted from the data buffer to the first plane and then control the user data to be transmitted from the data buffer to the second plane, via the data bus.

14. The storage device of claim 11, wherein:
the memory is a flash memory; and
the first plane and the second plane share a word line.

15. A memory system comprising:
a memory device; and
a controller configured to store user data and meta data in the memory device such that a time period for storing a first portion of the user data at least partially overlaps with a time period for storing meta data corresponding to a second portion of the user data, the second portion of the user data being stored in the memory device prior to the storing of the first portion of the user data.

16. The memory system of claim 15, wherein
storing the user data includes transmitting the user data to the memory device and writing the user data into the memory device; and
storing the meta data includes transmitting the meta data to the memory device and storing the meta data in the memory device.

17. The memory system of claim 16, wherein the controller is configured to store the user data and the meta data such that a time period to write the user data into the memory device at least partially overlaps with a time period to transmit the meta data to the memory device.

18. The memory system of claim 16, wherein the controller is configured to store the user data and the meta data such that a time period to write the meta data into the memory device at least partially overlaps with a time period to transmit the user data to the memory device.

19. The memory system of claim 16, wherein the controller is configured to store the user data and the meta data such that a time period to write the user data into the memory device at least partially overlaps with a time period to write the meta data into the memory device.

20. The memory system of claim 15, wherein controller is configured to store the user data and the meta data such that one of (i) the time period to store the user data entirely overlaps with the time period to store the meta data, and (ii) the time period to store the meta data entirely overlaps with the time period to store the user data.

* * * * *